(12) United States Patent
Kelley et al.

(10) Patent No.: US 9,684,847 B2
(45) Date of Patent: Jun. 20, 2017

(54) SPHERICAL LIGHTING DEVICE WITH BACKLIGHTING CORONAL RING

(71) Applicant: International Business Machines Corporation, Armonk, NY (US)

(72) Inventors: John F. Kelley, Clarkesville, GA (US); Douglas E. Lhotka, Highlands Ranch, CO (US); Kristin S. Moore, Atlanta, GA (US); Todd P. Seager, Orem, UT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/882,620

(22) Filed: Oct. 14, 2015

(65) Prior Publication Data

US 2016/0034777 A1 Feb. 4, 2016

Related U.S. Application Data

(63) Continuation of application No. 14/088,615, filed on Nov. 25, 2013, now Pat. No. 9,218,667.

(51) Int. Cl.
*G06K 9/00* (2006.01)
*G06K 9/46* (2006.01)
(Continued)

(52) U.S. Cl.
CPC .............. *G06K 9/4661* (2013.01); *G01J 1/00* (2013.01); *G06K 9/4604* (2013.01);
(Continued)

(58) Field of Classification Search
None
See application file for complete search history.

(56) References Cited

U.S. PATENT DOCUMENTS

| 5,049,916 A | 9/1991 | O'Such et al. |
| 5,323,204 A | 6/1994 | Wheeler et al. |

(Continued)

FOREIGN PATENT DOCUMENTS

| CN | 104657580 A | 5/2015 |
| EP | 0068779 B1 | 10/1985 |

(Continued)

OTHER PUBLICATIONS

Kasnoff, "Lighting tips: a case for Mannequins", pp. 1-12, accessed on Jul. 26, 2013, <http://rickasnoff.com.archives/770>.

(Continued)

*Primary Examiner* — Chan Park
*Assistant Examiner* — Iman K Kholdebarin
(74) *Attorney, Agent, or Firm* — Arnold Bangali

(57) ABSTRACT

A method for capturing three-dimensional photographic lighting of a spherical lighting device is described. Calculation of boundaries of the spherical lighting device based on lighting properties of at least one light source in a set location of the spherical lighting device is performed. A mapping of multitude points of the spherical lighting device to three-dimensional vectors of at least one camera device using a logical grid is performed. A measurement of brightness of the logical grid of the spherical lighting device is performed. The method further comprises determining brightest grid point of the logical grid of the spherical lighting device, wherein the brightest grid point of the logical grid is measured within a region brightness of the spherical lighting device. The method further comprises calculating the region of brightness of the spherical lighting device based on the determined brightest grid point of the logical grid.

20 Claims, 5 Drawing Sheets

(51) Int. Cl.
*G01J 1/00* (2006.01)
*H04N 13/02* (2006.01)
*G06T 7/11* (2017.01)
*G06T 7/13* (2017.01)
*G06T 7/90* (2017.01)

(52) U.S. Cl.
CPC .............. *G06K 9/4652* (2013.01); *G06T 7/11* (2017.01); *G06T 7/13* (2017.01); *G06T 7/90* (2017.01); *H04N 13/02* (2013.01); *G06K 2009/4666* (2013.01)

(56) References Cited

U.S. PATENT DOCUMENTS

| | | | | |
|---|---|---|---|---|
| 6,201,892 | B1* | 3/2001 | Ludlow | G01N 21/8806 250/559.34 |
| 6,512,838 | B1* | 1/2003 | Rafii | G01C 3/08 348/E3.018 |
| 7,859,722 | B1* | 12/2010 | Kulkarni | H04N 1/60 358/1.9 |
| 8,823,728 | B2* | 9/2014 | Jones | G09G 5/02 345/426 |
| 2001/0031142 | A1* | 10/2001 | Whiteside | G03B 7/00 396/61 |
| 2005/0053274 | A1 | 3/2005 | Mayer et al. | |
| 2008/0131007 | A1* | 6/2008 | Kutka | H04N 5/235 382/232 |
| 2009/0263028 | A1* | 10/2009 | Kwon | G06K 9/036 382/224 |
| 2010/0060639 | A1* | 3/2010 | Breton | G06T 15/50 345/426 |
| 2011/0032533 | A1* | 2/2011 | Izatt | G01B 11/2441 356/497 |
| 2011/0293140 | A1* | 12/2011 | Wagner | G06K 9/00624 382/103 |
| 2012/0008008 | A1* | 1/2012 | Nakabayashi | H04N 5/23219 348/223.1 |
| 2012/0044374 | A1 | 2/2012 | Pohlert et al. | |
| 2013/0121567 | A1* | 5/2013 | Hadap | G06T 15/50 382/162 |
| 2013/0328910 | A1* | 12/2013 | Jones | G09G 5/02 345/596 |
| 2014/0063287 | A1* | 3/2014 | Yamada | H04N 5/2351 348/229.1 |
| 2014/0078050 | A1 | 3/2014 | Fang | |
| 2015/0146970 | A1 | 5/2015 | Kelley et al. | |

FOREIGN PATENT DOCUMENTS

| | | |
|---|---|---|
| EP | 0570968 A2 | 11/1993 |
| JP | 2003337954 A | 5/2002 |
| WO | 03019285 A1 | 3/2003 |

OTHER PUBLICATIONS

Ng et al., "A Fast MAP Algorithm for High-Resolution Image Reconstruction with Multisensors", Multidimensional Systems and Signal Processing, vol. 12, 2001, pp. 143-164, Kluwer Academic Publishers, Boston, Manufactured in the Netherlands, Received Feb. 25, 2000; Revised Oct. 12, 2000.
Chinese Office Action for counterpart application No. 201410680648.8, filed Nov. 24, 2014, mailed on Feb. 17, 2017, pp. 1-5.

* cited by examiner

SPHERICAL LIGHTING DEVICE WITH BACKLIGHTING CORONAL RING

CROSS-REFERENCE TO RELATED APPLICATIONS

This application is a continuation of U.S. application Ser. No. 14/088,615 filed Nov. 25, 2013, the complete disclosure of which, in its entirety, is herein incorporated by reference.

FIELD OF THE INVENTION

The present invention relates generally to image data processing and more particularly to capturing three-dimensional photographic lighting of a spherical lighting device.

BACKGROUND

A light meter is a device used to measure the amount of light. In photography, a light meter is often used to determine the proper exposure for a photograph. Typically, a light meter will include a computer, either digital or analog, which allows the photographer to determine which shutter speed and f-number should be selected for an optimum exposure, given a certain lighting situation and film speed. Light meters are also used in the fields of cinematography and scenic design in order to determine the optimum light level for a scene. They are used in the general field of lighting, where they can help to reduce the amount of waste light used in the home, light pollution outdoors, and plant growing to ensure proper light levels.

SUMMARY

In one embodiment, a method for capturing three-dimensional photographic lighting of a spherical lighting device is provided. The method comprises calculating, by one or more processors, boundaries of the spherical lighting device based on lighting properties of at least one light source in a set location of the spherical lighting device. The method further comprises mapping, by the one or more processors, multiple points of the spherical lighting device to three-dimensional vectors of at least one camera device using a logical grid of the spherical lighting device. The method further comprises measuring, by the one or more processors, brightness of the logical grid of the spherical lighting device. The method further comprises determining, by the one or more processors, a brightest grid point of the logical grid of the spherical lighting device, wherein the brightest grid point of the logical grid is measured within a region brightness of the spherical lighting device. The method further comprises calculating, by the one or more processors, the region of brightness of the spherical lighting device based on the brightest grid point of the logical grid.

In another embodiment, a computer system method for capturing three-dimensional photographic lighting of a spherical lighting device is provided. The computer system includes
one or more processors, one or more computer-readable memories, one or more computer-readable tangible storage devices and program instructions which are stored on at least one of the one or more storage devices for execution by at least one of the one or more processors via at least one of the one or more memories. The computer system further includes program instructions to calculate boundaries of the spherical lighting device based on lighting properties of at least one light source in a set location of the spherical lighting device. The computer system further includes program instructions to map multiple points of the spherical lighting device to three-dimensional vectors of a camera device using a logical grid of the spherical lighting device. The computer system further includes program instructions to measure brightness of the logical grid of the spherical lighting device. The computer system further includes program instructions to determine a brightest grid point of the logical grid of the spherical lighting device, wherein the brightest grid point of the logical grid is measured within a region brightness of the spherical lighting device. The computer system further includes program instructions to calculate the region of brightness of the spherical lighting device based on the brightest grid point of the logical grid.

In yet another embodiment, program instructions for capturing three dimensional photographic lighting of a spherical lighting device is provided. The computer program product comprises one or more computer-readable tangible storage devices and program instructions stored on at least one of the one or more storage devices. The computer program product comprises program instructions to calculate boundaries of the spherical lighting device based on lighting properties of at least one light source in a set location of the spherical lighting device. The computer program product further comprises program instructions to map multitude points of the spherical lighting device to three-dimensional vectors of a camera device using a logical grid of the spherical lighting device. The computer program product further comprises program instructions to measure brightness of the logical grid of the spherical lighting device. The computer program product further comprises program instructions to determine the brightest grid point of the logical grid of the spherical lighting device, wherein the brightest grid point of the logical grid is measured within a region brightness of the spherical lighting device. The computer program product further comprises program instructions to calculate the region of brightness of the spherical lighting device based on the brightest grid point of the logical grid.

BRIEF DESCRIPTION OF THE SEVERAL VIEWS OF THE DRAWINGS

Novel characteristics of the invention are set forth in the appended claims. The invention will be best understood by reference to the following detailed description of the invention when read in conjunction with the accompanying Figures, wherein like reference numerals indicate like components, and:

DETAILED DESCRIPTION

Figure 1:
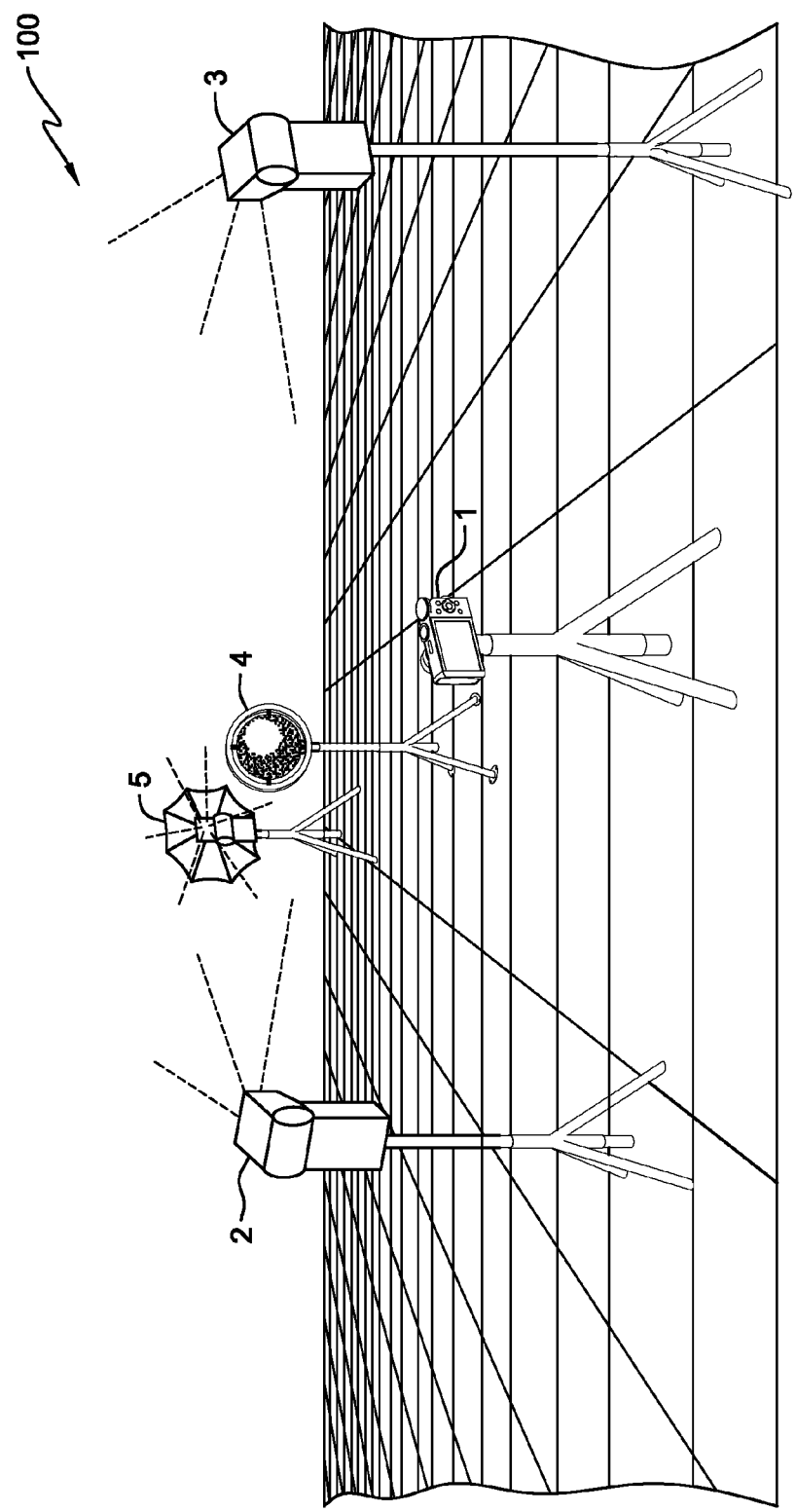
FIG. 1 is a functional diagram of a three-dimensional (3D) model spherical lighting dummy environment, in accordance with embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, a magnetic, an optical, an electromagnetic, an infrared, or a semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof.

A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The present invention will now be described in detail with reference to the accompanying Figures. Referring now to FIG. 1, a functional diagram of three-dimensional (3D) model spherical lighting dummy environment 100 shown, in accordance with embodiments of the present invention. According to at least one embodiment, 3D model spherical lighting dummy environment 100 includes a spherical lighting dummy with backlighting coronal ring that automates capture of a 3D photographic lighting configuration either passively by differential reflection combined with image processing algorithms of a camera of 3D model spherical lighting dummy environment 100, or actively by incorporating sensors on the surface of the spherical lighting dummy.

For example, in one embodiment, the camera of 3D model spherical lighting dummy environment 100 intercepts brightness and possibly, color, on points of the spherical lighting dummy to calculate lighting angle and intensity to build a lighting model, as described below. Brightness and color on points of the corona ring of the spherical lighting dummy can also calculate back lighting. Moreover, the spherical lighting dummy can also include a pattern printed on it to facilitate auto-focus for a more accurate registration of point brightness by the camera. Moreover, the spherical lighting dummy can also include an alignment system to allow accurate alignment with the camera. According to aspects of the present invention, color, temperature, and spectrum of reflected light of the spherical lighting dummy can be used for white balance or other color corrections. As described, the spherical lighting dummy can include incident sensors connected to it via blue tooth to the image processor, wherein the incident sensors are adapted to provide additional information to automate capture of a 3D photographic lighting configuration passively by differential reflection combined with image processing algorithms of a camera of 3D model spherical lighting dummy environment 100.

As depicted in FIG. 1, 3D model spherical lighting dummy environment 100 includes items 1, 2, 3, 4, and 5. Item 1 of 3D model spherical lighting dummy environment 100 is the camera, shown on a tripod, pointing at spherical lighting dummy (4), which is set up in the place where an actual subject of 3D model spherical lighting dummy environment 100 can be present during an actual photo shoot.

The camera can include image processing software that automates as described below. For example, in some embodiments, the camera of item 1 could be linked wirelessly to the lights and even to the spherical lighting dummy (if it is the "Active" version of the spherical lighting dummy and not the "Passive" version).

Item 2 is a light source pointing at the subject (for now, the spherical lighting dummy (4)), and it can be depicted from penetrated lines of imagery that it is "focused wide" meaning it is set to act more like a flood light than a spot light. Item 3 is another light, sitting on a stand behind the photographer to his or her right. Item 3 is also pointing toward the subject. Item 5 is a "back light" of another camera flash. In this example, it happens to be a flash that points to a photographer's reflective light umbrella to scatter the light and reflect it back toward the subject (and toward the camera). For example, a light umbrella serves to give a really broad (e.g., "flood") beam. Typically, a back light is "hidden" behind the subject so that the camera doesn't see the light directly but can see the effect of it, for example, by making a "halo" effect of a human model's hair. Item 4 is the spherical lighting dummy of 3D model spherical lighting dummy environment 100.

Figure 2:
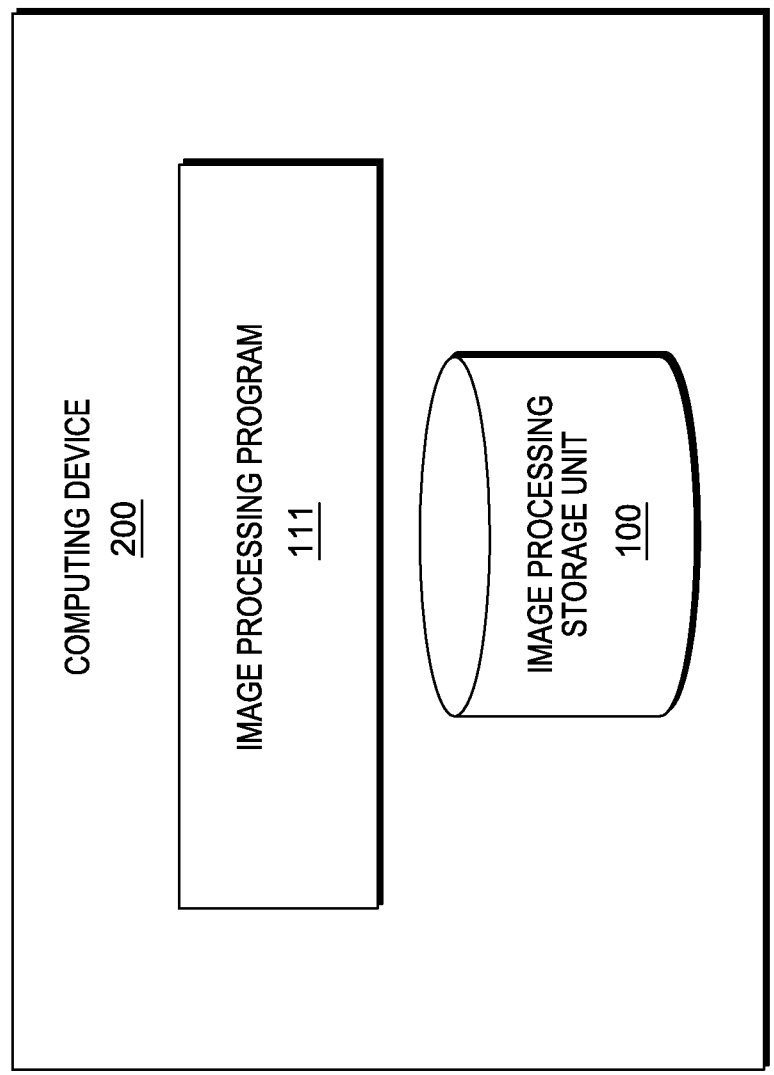
FIG. 2 is a functional block diagram illustrating program components of computing device 200 of a three-dimensional (3D) model spherical lighting dummy environment, in accordance with embodiments of the present invention.

FIG. 2 is a functional block diagram illustrating program components of computing device 200, wherein computing device 200 includes an image processor for automating capture of a 3D photographic lighting configuration of spherical lighting dummy of 3D model spherical lighting dummy environment 100, passively by differential reflection combined with image processing algorithms of computing device 200, in accordance with embodiments of the present invention.

Computing device 200 can be an image processing device, including, for example, a digital photo camera, a laptop, a tablet, or a notebook personal computer (PC), a desktop computer, a mainframe or mini computer, a personal digital assistant (PDA), or a smart phone, such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Computing device 200 includes image processing program 111 and image processing storage unit 106.

Image processing storage unit 106 is any type of storage device, storage server, storage area network, redundant array of independent discs (RAID), cloud storage service, or any type of data storage. Database storage device can be, for example, DB2® (DB2 is a registered trademark of International Business Machines Corporation in the United States, other countries or both). DB2® can be a relational model database server.

The relational model for database management of image processing storage unit 106 is a database model based on first-order predicate logic. In the relational model of a database, all data is represented in terms of tuples, grouped into relations. A database organized in terms of the relational model is a relational database. A relation of the relational model is defined as a set of tuples that have the same attributes. Image processing storage unit 106 stores information pertaining lighting properties of the more than one light sources of items 1, 2, 3, or 5 in the set location of the spherical lighting device of item 4, wherein the stored information can be based on a determination of whether the set location of the spherical lighting device of item 4 is appropriate for re-creating similar lighting properties for a subject in the set location of the spherical lighting device, wherein the determination is based on the calculated brightness of the spherical device.

Image processing program 111 can be any type of software that automates capture of a 3D photographic lighting configuration by differential reflection combined with image processing algorithms of computing device 200. According to at least one embodiment, using standard edge-detection image processing algorithms, the boundaries of item 4 as well as the boundaries of the coronal ring of item 4 are calculated by image processing program 111. Further, using a logical grid superimposed on item 4, a multitude of points on item 4 is mapped to 3D directional vectors (relative to the camera of item 1) by image processing program 111.

Image processing program 111 further calculates relative brightness of each grid point of item 4 that is measured, and by locating the brightest grid point of item 4, within a region of higher than average brightness, and mapping it to the stored longitude and latitude for that grid point, the direction of the light source of either of item 1, item 2, item 3, item 5 also is calculated by image processing program 111. Image processing program 111 also measures the broadness of the light source ("spot" vs. "flood") by calculating the width of the region of brightness (number of adjacent grid points with higher brightness) and the fall-off in brightness.

Optionally, the color of each grid point of item 4 can also be calculated by image processing program 111 to account for the interacting effects of different colored gels on the light sources of item 1, item 2, item 3, and item 5. According to at least one embodiment, using a similar logical grid superimposed on the semi-translucent coronal ring (with anti-reflection coating to prevent surface illumination from the front light sources), the direction and intensity of backlighting of item 4 can also be calculated. In this case, the longitude and latitude of the direction, as well as the broadness of the back light beam, is calculated by comparing the brightness at different points around the ring.

For example: a completely dark ring would mean no back lighting; an evenly bright ring would imply a back light that is directly behind the subject from the camera (0 degrees longitude and 180 degrees latitude); a ring that was mostly lit in the upper right quadrant would imply something like 45 degrees longitude and 135 degrees latitude.

Manual adjustments can be made to the placement, intensity and broadness (and, optionally, color gels) of the lights to optimize the subject lighting according to preferred profiles for different subjects of 3D model spherical lighting dummy environment 100. The inferred locations of all the lights on the set, as well as their intensity and broadness settings (and, optionally, any gels), can be saved on image processing storage unit 106 to assist in re-creating the exact same lighting for the photo shoot when the actual subject (e.g., talent) is in place of the spherical lighting dummy. This process might be more efficient if lights were lit one at a time to save these properties without interference from other lights. According to at least one embodiment, an active version of the spherical lighting dummy would do much the same but would use sensors of the spherical lighting dummy of item 4 arrayed on the surface rather than having the camera do the processing using the superimposed logical grid of the spherical lighting dummy of item 4. For example, results from sensors could be communicated to item 1 (camera) using a wireless channel. In the case of the active version of the spherical lighting dummy of item 4, rather than placing a multitude of sensors all over the surface of the sphere, optical fibers could lead from points along the sphere to a single CCD image capture device inside the sphere.

Figure 3C:
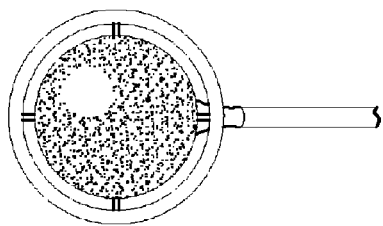
FIGS. 3A-3F depict a spherical lighting sphere with coronal ring and adjustable stand of a three-dimensional (3D) model spherical lighting dummy environment, in accordance with the present invention.
Figure 3F:
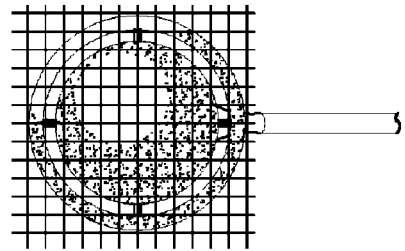
Figure 3B:
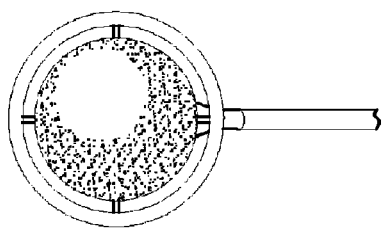
Figure 3E:
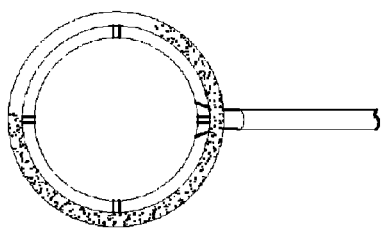
Figure 3A:
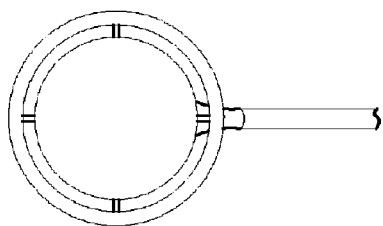

FIG. 3A depicts spherical lighting dummy item 4 with coronal ring and adjustable stand, wherein no lighting is shown, in accordance with the present invention. In the illustrated embodiment, spherical lighting dummy item 4 includes: (a) The Sphere, and (b) the semi-translucent backlighting coronal ring with anti-reflective coating (to minimize light reflected from forward lights), in accordance with the present invention.

FIG. 3B depicts spherical lighting dummy item 4 in front of the subject (not shown), up and to the right—broad lighting, in accordance with embodiments of the present invention. The illustrated embodiment depicts an illustration of item 2 as an off, item 3 was on at a medium intensity and loosely focused to a medium wide beam (flood vs. spot), and the item 5 backlight was centered and broad, in accordance with the present invention.

FIG. 3C depicts spherical lighting dummy item 4 in front of the subject (not shown), up and to the right—narrow focused lighting, in accordance with embodiments of the present invention. The illustrated embodiment depicts an illustration of item 2 as if item 3 was on at lower intensity and tightly focused to a tight beam (spot vs. flood), and the item 5 backlight was centered and broad, in accordance with the present invention.

Figure 3D:
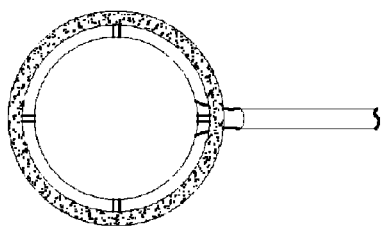

FIG. 3D depicts a coronal Ring of the spherical lighting device of item 5 with no backlighting, in accordance with embodiments of the present invention. The above example of FIG. 3D illustrates light item 2 and item 3 at full intensity and broadly focussed and the item 5 backlight was off, in accordance with embodiments of the present invention.

FIG. 3E depicts the Coronal Ring with light source behind the subject, pointing up and to the right, in accordance with embodiments of the present invention. FIG. 3E depicts item 2 and item 3 at a one position of a full intensity and broadly focused, and the items 5 backlight at an on position and positioned up and to the right behind the subject (relative to the camera).

FIG. 3F depicts logical representation of software brightness interpolation grid of item 5, in accordance with the present invention. FIG. 3F illustrates visual representation of the logical grid of item 5 that might be superimposed over a lighting image in a logical software representation of item 5, in accordance with the present invention.

Figure 4:
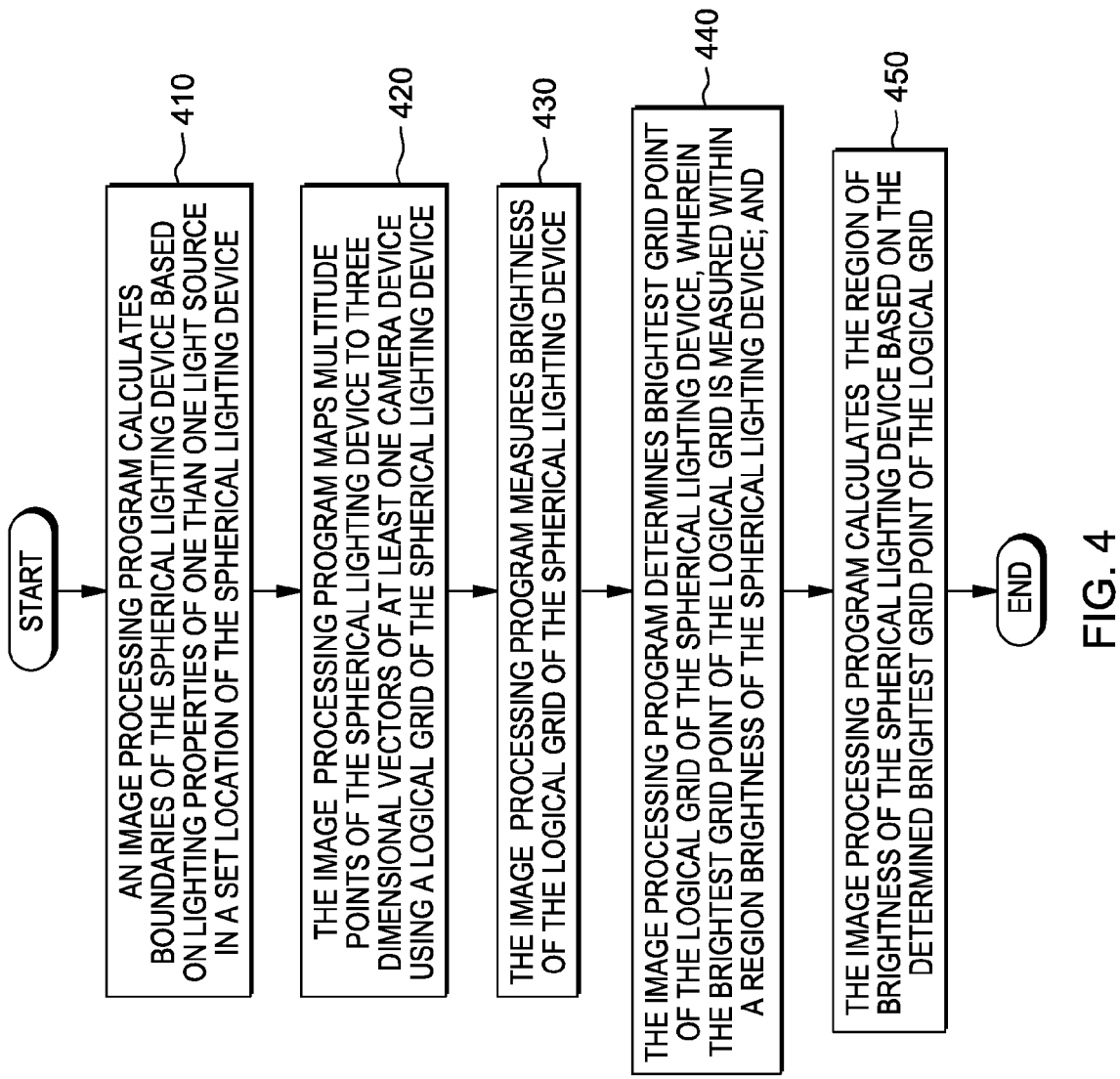
FIG. 4 is a flow diagram depicting steps performed by an image processing program for capturing three-dimensional photographic lighting of a spherical lighting device, in accordance with embodiments of the present invention.

FIG. 4 is a flow diagram depicting steps performed by image processing program 111 for capturing three-dimensional photographic lighting of a spherical lighting device, in accordance with embodiments of the present invention. At step 410, image processing program 111 calculates boundaries of item 4 based on lighting properties of more than one light source in a set location of item 4. At step 420, image processing program 111 maps multitude points of the spherical lighting device to three-dimensional vectors of at least one camera device using a logical grid of the spherical lighting device. At step 430, image processing program 111 measures brightness of the logical grid of the spherical lighting device. At step 440, image processing program 111 determines the brightest grid point of the logical grid of the spherical lighting device, wherein the brightest grid point of the logical grid is measured within a region brightness of the spherical lighting device. At step 450, image processing program 111 calculates the region of brightness of the spherical lighting device based on the determined brightest grid point of the logical grid.

Figure 5:
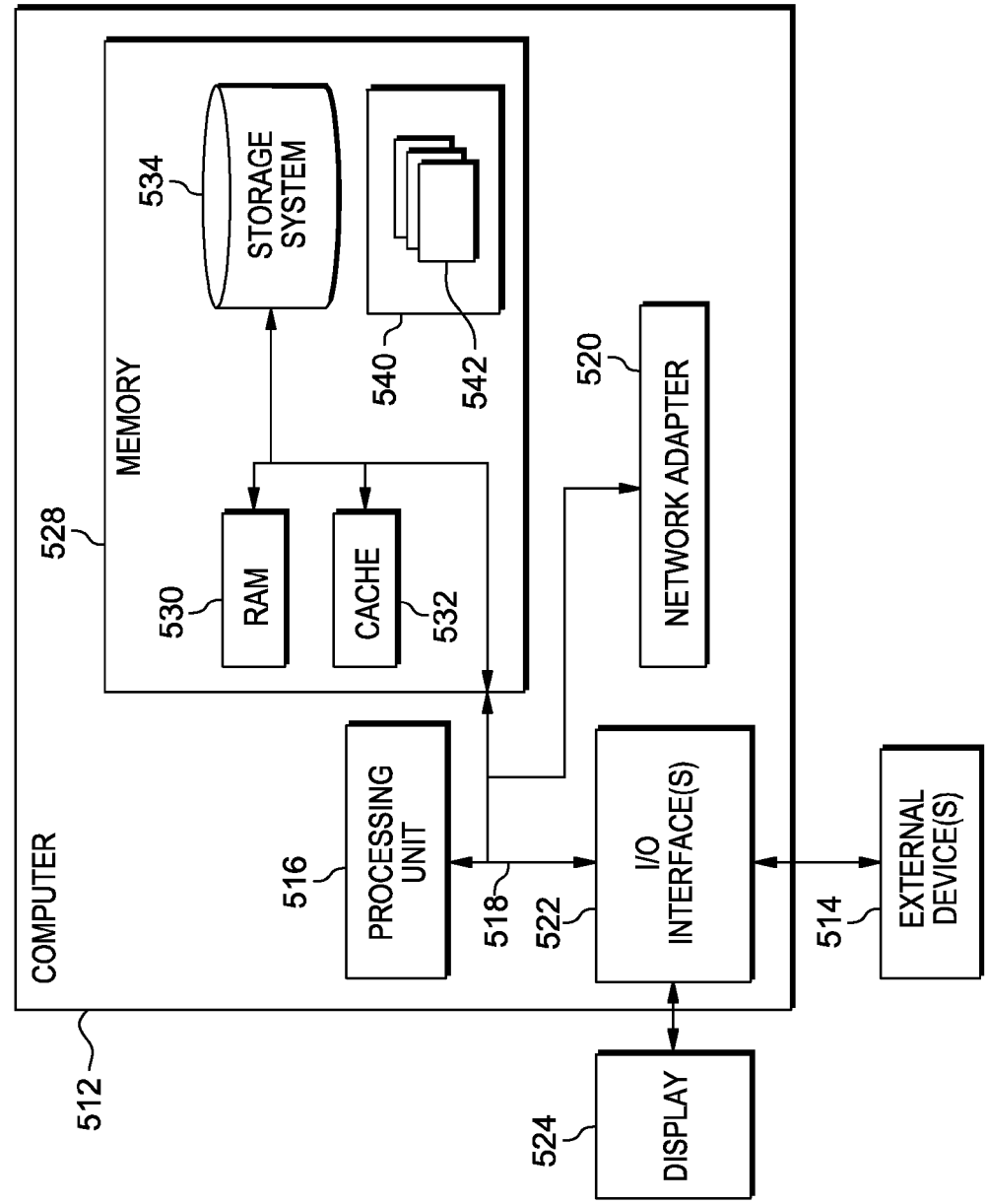
FIG. 5 illustrates a block diagram of components of a computer system, in accordance with embodiments of the present invention.

FIG. 5 is a functional block diagram of a computer system, in accordance with an embodiment of the present invention.

Computer system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computing device 200 can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 is shown in the form of a general-purpose computing device. The components of computer 512 may include, but are not limited to, one or more processors or processing units 516, memory 528, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512 and includes both volatile and non-volatile media and removable and non-removable media.

Memory 528 includes computer system readable media in the form of volatile memory, such as random access memory (RAM) 530 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM or other optical media, can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Image processing program 111 can be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Each one of image processing program 111 is implemented as an instance of program 540.

Computer 512 may also communicate with one or more external device(s) 514, such as a keyboard, a pointing device, etc., as well as display 524; one or more devices that enable a user to interact with computer 512; and/or any devices (e.g., network card, modem, etc.) that enable computer 512 to communicate with one or more other computing devices. Such communication occurs via Input/Output (I/O) interface(s) 522. Still yet, computer 512 communicates with one or more network, such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustrations are implemented by special purpose hardware-based systems that perform the specified functions or acts or combinations of special purpose hardware and computer instructions.

As will be appreciated by one skilled in the art, embodiments of the present invention may be embodied as a system, method, or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit", "module" or "system". Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, a magnetic, an optical, an electromagnetic, an infrared, or a semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object-oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method for capturing three-dimensional photographic lighting of a spherical light have been disclosed. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A method for capturing three-dimensional photographic lighting of a spherical lighting device, the method comprising:
    calculating, by one or more processors, boundaries of the spherical lighting device based on lighting properties of at least one light source in a set location of the spherical lighting device;
    mapping, by the one or more processors, multiple points of the spherical lighting device to three-dimensional vectors of at least one camera device using a logical grid of the spherical lighting device;
    automating, by the one or more process, a capture of the three dimensional vectors passively through differential reflection combined with image processing algorithms of the camera device or actively by incorporating sensors on surface of the spherical lighting device;
    measuring, by the one or more processors, brightness of the logical grid of the spherical lighting device;
    determining, by the one or more processors, a brightest grid point of the logical grid of the spherical lighting device, wherein the brightest grid point of the logical grid is measured within a region brightness of the spherical lighting device; and
    calculating, by the one or more processors, the region of brightness of the spherical lighting device based on the brightest grid point of the logical grid.

2. The method according to claim 1, further including: determining, by the one or more processors, whether the lighting properties of the at least one light source in the set location of the spherical lighting device is appropriate for re-creating similar lighting properties for a subject in the set location of the spherical lighting device, and wherein the determination is based on the calculated region of brightness of the spherical device.

3. The method according to claim 1, wherein the region of brightness of the spherical lighting device is based on adjacent grid points of the spherical lighting device.

4. The method according to claim 1, wherein the spherical lighting device captures lighting properties from the at least one light source.

5. The method according to claim 4, wherein the spherical lighting device is positioned in front of the at least one light source.

6. The method according to claim 5, wherein the spherical lighting device is positioned in a future position of a subject to be lighted.

7. The method according to claim 1, further including: intercepting, by the one or more processors, brightness and color of the spherical lighting device.

8. A computer system for capturing three-dimensional photographic lighting of a spherical lighting device, the computer system comprises:
    one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
    program instructions to calculate boundaries of the spherical lighting device based on lighting properties of at least one light source in a set location of the spherical lighting device;
    program instructions to map multiple points of the spherical lighting device to three-dimensional vectors of a camera device using a logical grid of the spherical lighting device;
    program instructions to automate a capture of the three dimensional vectors passively through differential reflection combined with image processing algorithms of the camera device or actively by incorporating sensors on surface of the spherical lighting device;
    program instructions to measure brightness of the logical grid of the spherical lighting device;
    program instructions to determine a brightest grid point of the logical grid of the spherical lighting device, wherein the brightest grid point of the logical grid is measured within a region brightness of the spherical lighting device; and
    program instructions to calculate the region of brightness of the spherical lighting device based on the brightest grid point of the logical grid.

9. The computer system according to claim 8, further including: program instructions to determine whether the lighting properties of the at least one light source in the set location of the spherical lighting device is appropriate for re-creating similar lighting properties for a subject in the set location of the spherical lighting device, and wherein the determination is based on the calculated brightness of the spherical device.

10. The computer system according to claim 8, wherein the region of brightness of the spherical lighting device is based on adjacent grid points of the spherical lighting device.

11. The computer system according to claim 8, wherein the spherical lighting device captures lighting properties from the at least one light source.

12. The computer system according to claim 11, wherein the spherical lighting device is positioned in front of the at least one lighting source.

13. The computer system according to claim 12, wherein the spherical lighting device is positioned in a future position of a subject to be lighted.

14. The computer system according to claim 8, further includes program instructions to intercept and color of the spherical lighting device.

15. A computer program product comprising:

one or more computer-readable tangible storage devices and program instructions stored on at least one of the one or more storage devices, the program instructions comprising:

program instructions to calculate boundaries of the spherical lighting device based on lighting properties of at least one light source in a set location of the spherical lighting device;

program instructions to map multiple points of the spherical lighting device to three-dimensional vectors of a camera device using a logical grid of the spherical lighting device;

program instructions to automate a capture of the three dimensional vectors passively through differential reflection combined with image processing algorithms of the camera device or actively by incorporating sensors on surface of the spherical lighting device;

program instructions to measure brightness of the logical grid of the spherical lighting device;

program instructions to determine a brightest grid point of the logical grid of the spherical lighting device, wherein the brightest grid point of the logical grid is measured within a region brightness of the spherical lighting device; and program instructions to calculate the region of brightness of the spherical lighting device based on the brightest grid point of the logical grid.

16. The computer program product according to claim 15, further includes: program instructions to determine whether the lighting properties of at the least one light source in the set location of the spherical lighting device is appropriate for re-creating similar lighting properties for a subject in the set location of the spherical lighting device, and wherein the determination is based on the calculated brightness of the spherical device.

17. The computer program product according to claim 15, wherein the region of brightness of the spherical lighting device is based on adjacent grid points of the spherical lighting device.

18. The computer program product according to claim 15, wherein the spherical lighting device captures lighting properties from the at least one light source.

19. The computer program product according to claim 18, wherein the spherical lighting device is positioned in front of the at least one light source.

20. The computer program product according to claim 15, further includes program instructions to intercept and color of the spherical lighting device.

\* \* \* \* \*